(12) United States Patent
Miles

(10) Patent No.: US 10,253,491 B2
(45) Date of Patent: Apr. 9, 2019

(54) LEACHING TUBE

(71) Applicant: Winferd R Miles, Elmhurst, IL (US)

(72) Inventor: Winferd R Miles, Elmhurst, IL (US)

(*) Notice: Subject to any disclaimer, the term of this patent is extended or adjusted under 35 U.S.C. 154(b) by 0 days.

(21) Appl. No.: 15/588,286

(22) Filed: May 5, 2017

(65) Prior Publication Data
US 2018/0320359 A1    Nov. 8, 2018

(51) Int. Cl.
| | |
|---|---|
| *E03F 3/06* | (2006.01) |
| *C02F 3/06* | (2006.01) |
| *E02B 11/00* | (2006.01) |
| *E02B 11/02* | (2006.01) |
| *F16L 1/028* | (2006.01) |

(52) U.S. Cl.
CPC ............. *E03F 3/06* (2013.01); *C02F 3/06* (2013.01); *E02B 11/005* (2013.01); *E02B 11/02* (2013.01); *F16L 1/028* (2013.01)

(58) Field of Classification Search
CPC .......... E03F 3/06; E02B 11/00; E02B 11/005
USPC .................................................. 405/43–45
See application file for complete search history.

(56) References Cited

U.S. PATENT DOCUMENTS

| | | | | |
|---|---|---|---|---|
| 4,003,122 | A * | 1/1977 | Overmyer | B29C 63/22 29/234 |
| 7,118,669 | B1 * | 10/2006 | Branz | C02F 1/006 210/170.08 |
| 9,273,456 | B1 * | 3/2016 | Miles | E03F 1/002 |
| 2005/0042031 | A1 * | 2/2005 | Mirzakhanov | A01G 25/06 405/36 |
| 2005/0058510 | A1 * | 3/2005 | Parker | E02B 11/005 405/36 |

FOREIGN PATENT DOCUMENTS

GB    2051295    * 1/1981

* cited by examiner

*Primary Examiner* — Sean D Andrish
(74) *Attorney, Agent, or Firm* — Erickson Law Group, PC

(57) ABSTRACT

A leaching tube includes a tube base for burial in the earth to disperse or gather liquids, the tube base having a semi-rigid spiral, or helical, form with spiral, or helical, ribs, and spiral, or helical, openings along the length of the tube, a water permeable covering wrapped around the tube base, and a vertical frame inside the tube. The frame is a pipe frame that supports the spiral tube base and also provides an air conduit for air injection inside the tube. The frame is fixed to the spiral ribs on the top and bottom of the frame. End plates can be fixed to the frame by bridge pieces and pins. Sections of tubes can be connected end to end by bridge pieces and pins. The pins can be pipe pieces that can also provide air connections between the tube sections. One of the end plates can provide an inlet opening for an effluent inlet pipe.

23 Claims, 2 Drawing Sheets

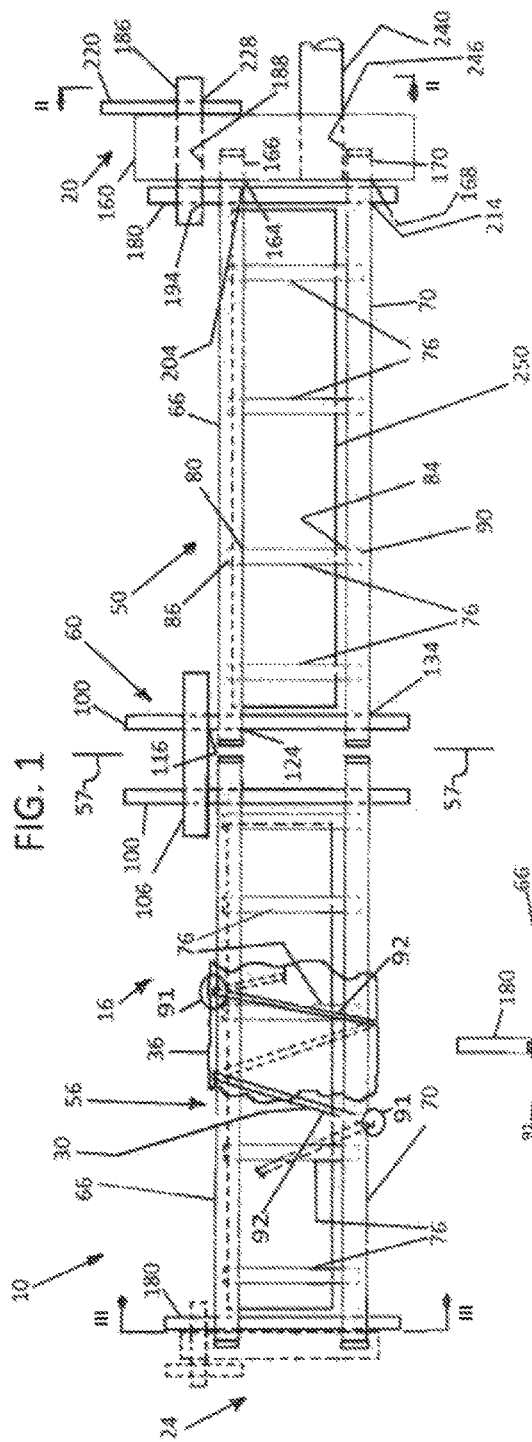
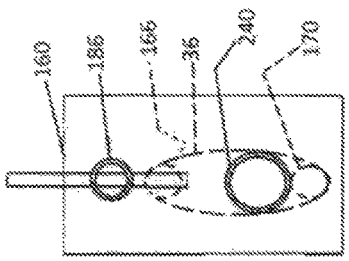
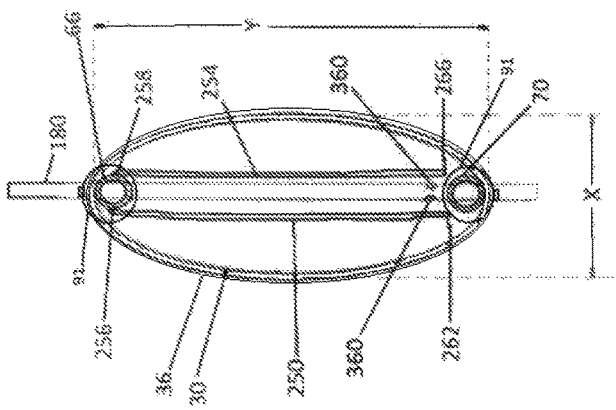
FIG. 1
FIG. 2
FIG. 3

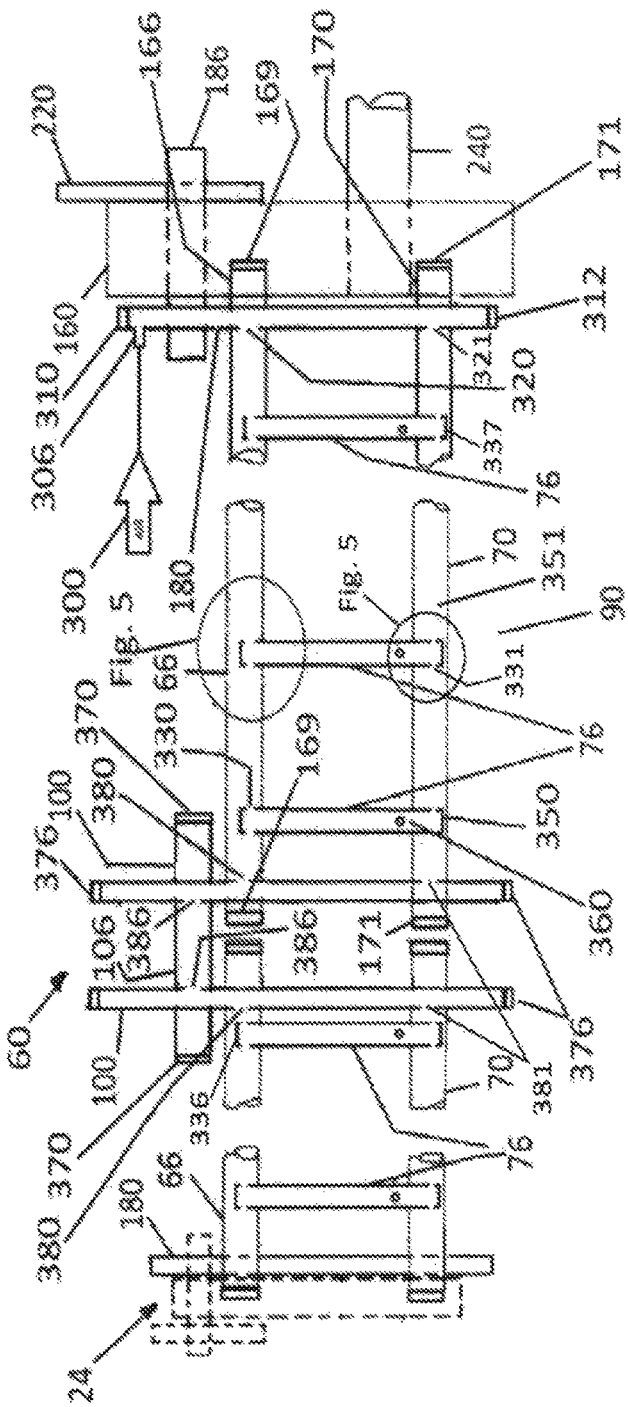

LEACHING TUBE

BACKGROUND

Septic treatment systems are used to treat and dispose of effluent, or wastewater, from residences and commercial buildings. Septic treatment systems are onsite systems that do not involve central wastewater collection and treatment as in municipal water treatment. A typical septic treatment system includes a septic tank and a leach field, or drain field, and the entire system is located underground. The septic tank is a conduit that essentially digests organic matter and separates floatable matter, such as oils and grease, and non-floatable solids from the effluent. Effluent is then discharged from the septic tank into a distribution pipe that drains into a leach field. The leach field contains a leach-field system that either is composed of gravel or is gravel-less. The leach-field system is designed to slowly release effluent into the soil, which purifies the effluent.

A leach field serves two key functions: to dispose of effluent from septic tanks and to distribute effluent in a manner allowing adequate, natural wastewater treatment in the soil before any harmful contaminants reach the underlying groundwater aquifer. Leach-field systems are integral in removing or neutralizing pollutants like disease-causing pathogens, nitrogen, phosphorus, and other contaminants. When any part of the septic system is inappropriate or inadequate based on the conditions or other factors, failures occur, including contamination of underground water aquifers. The most serious documented problems involve contamination of surface waters and ground water with disease-causing pathogens and nitrates. When working properly, a leach-field system allows the surrounding soil to filter the pollutants in the effluent before the effluent reaches the underlying groundwater aquifer. The soil reduces or completely removes harmful contaminants from the effluent.

Leach fields, or drain fields, are typically classified as either gravel or gravel-less systems. Historically, gravel systems (e.g., gavel and pipe systems) have been used in leach fields. In gravel systems, perforated pipes that distribute the effluent are placed over a layer of gravel underground. Then four inches of additional rock are placed around the pipe and two inches above the pipe. The installation of a gravel system creates a problem in that the drain field could be compromised by the compaction of moist soil resulting from the use of heavy equipment that is necessary for the installation of gravel. Compaction of the soil reduces the percolation of the effluent and reduces effluent filtration.

Additionally, gravel and pipe leach-field systems require a lot of space and in most cases, an adequate amount of space is not available. Gravel and pipe systems also require a large amount of gravel that must be hauled in by a dump truck. The time and labor-consuming installation of a pipe and gravel system, along with space limitations, creates higher costs and installation difficulties. Thus, the pipe and gravel drain-field system has grown out of use by septic system installation professionals.

Gravel-less drain-field systems include the use of plastic tubes or pipes perforated with holes throughout and covered with spun-bonded permeable nylon filter fabric. The perforated pipes are typically 20 to 30.5 cm (8 to 12 inches) in diameter and are placed in a 30.5 cm (12 inch) to 61 cm (24 inch) underground trench.

Nitrogen compounds, suspended solids, organic and inorganic materials, and bacteria and viruses must be reduced before effluent is considered purified. These pollutants are reduced or completely removed from the effluent by the soil into which the effluent drains from the leaching chambers. Soil aeration, the presence of oxygen in the soil, and good soil drainage promote nitrification. Nitrification of septic tank effluent is necessary to reduce or eliminate hazardous pollutants and is a biologically sensitive process that is dependent on soil environment. Nitrifying bacteria, found only in the top several feet of soil, converts poisonous organic nitrogen and urea components in effluent into ammonium, nitrites, and nitrates. Nitrates, in turn, are tapped by the amino acids in plant roots and become plant food. Denitrification occurs when oxygen diffusion rates in soil are insufficient to meet the demands from microbial respiration, resulting in sludge. This situation arises when soil is near or at water saturation level and oxygen diffusion is slowest, as is the case when the effluent is essentially covered on top with a solid material, such as the arch-chamber segments, and evaporation and oxygenation is inhibited.

SUMMARY

In accordance with one embodiment a leaching tube comprises a tube base for burial in the earth to disperse or gather liquids, the tube base having a semi-rigid spiral, or helical, form with spiral, or helical, ribs, and spiral, or helical, openings along the length of the tube, a water permeable covering wrapped around the tube base, and a vertical frame inside the tube.

The frame can be a pipe frame that supports the spiral tube base and can also provide an air conduit for air injection inside the tube. The frame can be fixed to the spiral ribs on the top and bottom of the frame. End plates can be fixed to the frame by bridge pieces and pins. Sections of tubes can be connected end to end by bridge pieces and pins. The pins can be pipe pieces that can also provide air connections between the tube sections. One of the end plates can provide an inlet opening for an effluent inlet pipe.

Accordingly, several advantages of one or more aspects are as follows: to provide a leaching conduit for effluent or underground water that provides structure and stability to the surrounding soil, that is resistant to caustic liquids, that promotes oxygenation above the leaching conduit, that promotes gas filtration through the soil, that provides a greater area for the percolation of effluent by providing 360 degrees of exfiltration to the surrounding soil, that allows for higher removal of pollutants from effluent, that is easier to transport and easier to install because it is lightweight, that is easy to manufacture, and that is modifiable to a variety of soil conditions and space constraints. Other advantages of one or more aspects will be apparent from a consideration of the following description and the accompanying drawings.

Numerous other advantages and features of the present invention will be become readily apparent from the following detailed description of the invention and the embodiments thereof, and from the accompanying drawings.

BRIEF DESCRIPTION OF THE DRAWINGS

FIG. 1 is an elevation view of an exemplary embodiment leaching tube of the invention;

FIG. 2 is a sectional view taken generally along lines 2-2 of FIG. 1;

FIG. 3 is a sectional view taken generally along lines 3-3 of FIG. 1;

FIG. 4 is an air flow diagram of the embodiment shown in FIG. 1; and

FIG. 5 is an enlarged view, shown in section in the areas indicated in FIG. 4.

DETAILED DESCRIPTION

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference both U.S. Pat. No. 9,273,456 and US Published Patent Application US2016/0251842.

One embodiment of the leaching tube is illustrated in FIG. 1 to FIG. 5.

A leaching tube assembly 10 is illustrated in FIGS. 1 and 2. The assembly 10 includes a frame 16 connected at opposite ends to an end plate assembly 20 and an end plate assembly 24. A spiral tube base 30 surrounds the frame 16. A water permeable covering 36 surrounds the spiral tube base 30.

The spiral tube base 30 consisting of a solid pipe comprised of polyvinyl chloride, or PVC, or comprised of a material suitable for effluent or water and underground applications. The diameter of the spiral tube base 30 is adjustable based on need and could range from a few inches (several centimeters) to a few feet (or one meter) in diameter. One embodiment is illustrated in FIG. 1 to FIG. 5 and consists of a 10-inch spiral tube base 30 (approximately 25.5 cm). One continuous spiral form remains with spiral ribs that comprise the one continuous spiral form when a solid PVC pipe is cut into a spiral shape. In one embodiment, a miter saw was used to cut the continuous spiral form from the 10-inch (25.5 cm) PVC pipe. The miter saw was modified to cut a pipe of 10-inches: (25.5 cm) in diameter and a blade was used that is suitable for cutting PVC pipe of at least one-half of an inch (1.27 cm) to one inch (2.54 cm) in thickness. The thickness of the PVC pipe or a pipe suitable for effluent or water and underground applications can vary based on the use and the application of the leaching tube. The pipe is cut into a spiral shape with precision by holding and rotating the pipe as it is being cut on the saw. The size of the spiral openings or the distance between the spiral ribs can vary based on the length and the diameter of the pipe and on the use and application of the leaching tube.

The assembly 10 can have approximate dimensions X of about 8.5 inches and Y about 11 inches (FIG. 3). Other sizes of a wide variety are encompassed by the invention.

The covering 36 can be geogrid material wrapped around the spiral tube base 30, such as a flexible geo-synthetic material with a repeating grid structure of rectangular-shaped openings. Alternatively, the covering 36 can be formed from a fiberglass screen, mesh or grid material or similar material. Both these materials are described in detail in U.S. Pat. No. 9,273,456 and/or US Published Patent Application US2016/0251842, both herein incorporated by reference.

The frame 16 includes a first frame component 50 and a second frame component 56. The frame components are mirror image substantially identical across a center plane 57. In that regard, only the frame component 50 will be described in detail.

The frame component 50 includes an upper beam 66 and a parallel lower beam 70. The upper and lower beams 66, 70 are connected by spaced-apart columns 76. The upper beam 66 can include spaced-apart openings 80 sized to tightly receive upper portions 86 of the columns 76. The lower beam can include spaced-apart openings 84 for receiving lower portions 90 of the columns 76.

The spiral tube base 30 is attached by attachments 91 to the frame 16 at regular intervals on the upper beam 66 and the lower beam 70 along the spiral of the spiral base tube. The mechanism for the attachment can take many forms. For example "zip ties" or cable ties or ratchet ties 91 are shown (before tightening, FIG. 3) surrounding the upper or lower beam and a spiral rib 92 of the spiral base tube. Holes would be provided in the curtains 250, 254 (described below) to accommodate the ratchet ties. The attachments 91 act to attach spiral ribs 92 of the spiral base tube to both the upper beam 66 and the lower beam 70. These attachments help keep the frame vertical and also rigidly fix the spiral tube axially along its length. In effect, since the spiral base tube has the axial properties of a spring, the fixation to the frame 16 fixes the axial length of the spiral base tube and fixes the spacing of the spiral ribs of the spiral base tube. The attachments shown schematically by the circles 91 in FIG. 1 could be a ratchet tie, also known as a cable tie, an adhesive connection, a fastener connection, or any other known connection or attachment.

A coupling assembly 60 is provided to connect the first frame component 50 with the second frame component 56. A pin 100 fits through a bridge piece 106 through a through hole 116. The pin also fits through a through hole 124 through the upper beam 66, and through a through hole 134 through the lower beam 70. The through holes 116, 124, 134 are sized to allow for the pin 100 to tightly pass through the bridge piece 106 and the upper and lower beams to be resiliently gripped in place.

On an opposite end of the frame component 50, the end plate assembly 20 includes an end plate 160. The plate 160 includes two sockets 164, 168 that received end portions 166, 170 of the upper and lower beams 66, 70 respectively. End caps 169, 171 can be used to close the upper and lower beams 66, 70 or the end plate 160 can perform the closing function. A pin 180 penetrates through a through hole 194 through a bridge piece 186. The pin 180 penetrates through a through hole 204 through the upper beam 66 and through a through hole 214 through the lower beam 70. The openings 194, 204, 214 are sized to resiliently grip the pin 180 to hold the components 180, 186 in place. The bridge piece 186 penetrates through an opening 188 through the end plate 160. Another pin 220 penetrates the bridge piece 186 through a through hole 228 to lock the frame component 50 to the end plate 160. An inlet pipe 240 is fixed to an opening 246 to pass effluent from a septic tank into the leaching tube.

FIG. 3 illustrates the tube base 30 surrounded by the water permeable covering 36. Inside the tube base 30, a first curtain 250 is attached along its top edge 256 to a side of the upper beam 66. A second curtain 254 is attached along its top edge 258 to an opposite side of the upper beam 66. The curtains 250, 254 loosely hang on opposite sides of the columns 76 unattached at lower edges 262, 266. The curtains 250, 254 can be substantially rectangular and extend substantially the length of each frame component 50, 56. The tube base 30 is shown as being elliptical or oval in shape, although other shapes, such as a circular shape, are encompassed by the invention.

FIG. 4 is a schematic view showing an air distribution system for the frame. Advantageously, the pins 100, 180 and the bridge piece 106 and the upper beam 66 are pipes that can contain and convey air. Pressurized air 300 is delivered into a nozzle 306 open into the pin 180. The pin 180 is closed by caps 310, 312 or the like, at top and bottom ends, respectively. Within the upper beam 66, the pin 180 has an air opening 320 for delivering air from the pin 180 into the upper beam 66. Within the lower beam 70, the pin 180 has an air opening 321 for delivering air from the pin 180 into the lower beam 70.

FIG. 5 shows an end detail of each column 76 applicable to both the upper and lower portions 86, 90 of the column, the lower end being a mirror image reversal across a horizontal plane of the upper end. Each columns 76 includes an opening 330 (FIG. 5) and a top closure 336 within the upper beam 66 and an opening 331 (FIG. 5) and a closure 337 within the lower beam 70. The closure 336, 337 can be a cap or alternatively can be provided by the end surfaces 350 of the columns 76 being contoured to closely conform to an inside surface 346 of the upper beam 66 and the inside surface 351 of the lower beam 70. Alternately, the end edge 347 of each column 76 can be open into the upper beam 66 and lower beam 70 and the openings 330, 331 eliminated. It is also encompassed by the invention that only one of the beams 66, 70 carry air to the columns 76.

Above the lower beam 70, and near the lower end of each column, one or more air holes 360 are provided open from inside the column 76 to an outside of the column.

The bridge piece 106 has opposite end closures 370. The pin 100 has opposite end closures 376 and an air opening 380 within the upper beam 66 and an air opening 381 within the lower beam 70, and an upper air opening 386 within the bridge 106.

In operation, air passes into the nozzle 306 from the air supply 300. The air passes into the pin 180 and into the upper beam 66 and the lower beam 70 via the opening 320, 321 and into the columns 76 via the openings 330, 331. Air then exits the columns via the openings 360. The air bubbles up between the curtains 250, 254. Air can pass from the frame components 50 to the frame component 56 by passing into the air openings 380, 381 of the frame component 50 up through the pin 100 and out of the air opening 386 into the bridge 106. Air in the bridge 106 passes into the pin 100 of the second frame component 56 via the opening 386, and then out of the pin openings 380, 381 of the pin 100 of the second frame component 56, and into the upper beam 66 and lower beam 70 of the second frame component 56. Once in the upper beam 66 and lower beam 70 of the second frame component 56, the air can be distributed into each columns 76 of the second frame component 56 and then out of the openings 360 of each columns 76 in the same manner as for the first frame component.

As air passes out of the holes 360 of the columns of both frame section 50, 56, into the tube base and it percolates between and onto the curtains 250, 254. The curtains can be composed of polyester fabric and can provide substrate forming a microbial chamber for the growth of helpful bacteria.

The end plate 160 can consist of a sheet of rigid PVC material that is approximately one inch in thickness. The end plate 160 can consist of any material of sufficient rigidity that is suitable for burial within the earth. The end plate 160 is necessary for holding into place the distribution pipe 240 into place from the septic tank (not shown).

In one embodiment, the end plate assembly 24 covers a distal end of a chain of leaching tubes. The end plate assembly 24 can have an end plate 160 of the same material and configuration as the inlet plate end plate 160 except without the opening 246 for an inlet pipe. The end plate 24 assembly can be used at the end of a succession of leaching tubes that are connected together underground to form one long tube line for the purpose of filtering the effluent into the surrounding soil.

According to one embodiment, the upper beam 66, the lower beam 70, the bridges 106, 186 comprise 1 inch PVC pipe. The columns 76 and the pins 100, 180, 220 comprise ½ inch PVC pipe.

Installation

First, a trench is dug into the ground where the drain or leach field will be located (usually several trenches are dug). The depth, width, and length of the trench are based on the size of the drain field and the size of the leaching chamber, as well as local and state regulations. Next, the leaching tube is placed within the trench. Typically, several OT more leaching tubes are connected end to end, forming a long chain of leaching tubes inside of the trench. However, the leaching tubes could also be stacked on top of each other with sufficient space underground. Typically, a leaching tube that would be stacked on top of or adjacent to another leaching tube would be of a smaller diameter, such as four inches (10.16 cm). The number of leaching tubes that are necessary depends on the size of the drain field. The leaching tubes can be connected end to end by coupling assemblies 60 to form a long chain of leaching tubes. The leaching tubes can also be connected side-by-side or stacked with the use of couplings as well. It is contemplated that the need for fasteners will be eliminated when the leaching tube is fabricated to allow for one leaching tube to be attached, connected, or hooked onto the subsequent leaching tube. The end plate assembly 24 is placed at the distal end of the final or terminating tube of the chain of leaching tubes.

Next, the distribution pipe from the septic tank is inserted into the inlet plate 160. Under certain circumstances, rosin paper could be placed on top of the chain of leaching tubes before the replacement of topsoil over the trench. Rosin paper is useful to provide structure to the disturbed topsoil above the leach field and to prevent too much of that disturbed topsoil from entering the leaching tube during and after installation. Rosin paper provides time for the disturbed topsoil to settle, or reestablish its structure, so that less top soil enters the leaching tube, which improves the exfiltration capabilities. Rosin paper is a biodegradable material that eventually disintegrates and does not need replacement.

Typically, several inches of topsoil are placed on top of the leaching tubes, then sod is installed or the lawn is reseeded, so that the leach field is hidden and otherwise looks like an undisturbed area. The depth of topsoil above a leach or drain field varies based on local and state regulations.

The spiral tube base 30 can consist of any pipe of various lengths, widths, diameters, and thicknesses and that is suitable for burial within the earth. The spiral tube base 30 can also consist of any material that, is able to be cut, formed, fabricated, molded, or shaped into a spiral tube and that has sufficient flexibility and sufficient rigidity to maintain its spiral shape over time.

Although the description above contains many specificities, this should not be construed as limiting the scope of any embodiment, but as merely providing descriptions of some of several embodiments.

For example, the leaching tube can have different shapes other than the circle or oval shape of a pipe or tube and also can be shaped as a square, rectangle, or triangle, etc. The shape of the leaching tube can be changed when the semi-rigid spiral tube or element is fabricated or molded and not cut from a PVC pipe. The leaching tube can be made in modular sections, which would result in faster manufacturing, transportation, and installation. The manner of connecting the modular sections could be integrated or molded onto each end of the leaching tube. The modular sections of the leaching tube also can be connected with the use of various suitable fasteners.

Many other ramifications and variations are possible within the teachings of the various embodiments. For example, the semi-rigid-spiral tube or element can be different sizes, including various diameters, various lengths, and various thicknesses based on the needs of the consumer. The material surrounding the semi-rigid spiral tube or element may comprise any material that has liquid leaching and percolating qualities and that can be used for burial within the earth with sufficient durability.

Thus the scope of the embodiments should be determined by the appended claims and their legal equivalents, and not by the examples given.

The invention claimed is:

1. A leaching tube assembly for burial in the earth to disperse effluent into surrounding soil, comprising:
    a spiral tube base having a longitudinal axis and an inside perimeter and a height within the inside perimeter;
    a water permeable material wrapped around the spiral tube base; and
    a vertically oriented frame located within the tube base and having spaced-apart vertical columns that are perpendicular to the longitudinal axis, and upper and lower beams connected by the vertical columns, the upper beam located at a top of the height and the lower beam located at the bottom of the height, the frame supporting the height of the tube base.

2. The leaching tube assembly of claim 1, wherein said spiral tube base is composed of polyvinyl chloride.

3. The leaching tube assembly of claim 1, wherein the water permeable material comprises a fiberglass mesh material with rectangular grid openings.

4. The leaching tube assembly of claim 3, wherein the rectangular grid openings are square openings having a ¼ inch side.

5. The leaching tube assembly of claim 1, further including an inlet plate covering an intake end of said spiral tube base.

6. The leaching tube assembly of claim 5, wherein said inlet plate has an opening to hold an incoming pipe.

7. The leaching tube assembly of claim 1, wherein at least some of the vertical columns and the upper and lower beams comprise tubular members that can contain and convey air, and the frame includes an air inlet into the tubular members and a plurality of air outlets out of the tubular members and inside the spiral tube base.

8. The leaching tube assembly of claim 7, wherein the air is received into the upper beam and is delivered into the columns, and each column has an opening to deliver air into the spiral tube base.

9. The leaching tube assembly of claim 8, wherein the frame comprises first and second sections arranged end-to-end and connected together by a coupling assembly, wherein the coupling assembly comprises a bridge arranged outside the spiral tube base and spanning the first and second sections, and a first pin penetrating the bridge and the first section and a second pin penetrating the bridge and the second section.

10. The leaching tube assembly of claim 7, wherein the air is received into the upper beam and is delivered into the columns, and delivered into the spiral tube base from spaced-apart openings in a lower portion of the frame.

11. The leaching tube assembly of claim 10, wherein the frame comprises first and second sections arranged end-to-end and connected together by a coupling assembly.

12. The leaching tube assembly of claim 1, wherein the frame comprises first and second sections arranged end-to-end and connected together by a coupling assembly.

13. The leaching tube assembly of claim 1, comprising an end plate assembly connected to one end of the frame, the end plate assembly comprising an end plate, a bridge, a first pin and a second pin, the first pin penetrating the bridge and the frame and the second pin penetrating the bridge and backing a side of the end plate opposite the frame.

14. The leaching tube assembly of claim 13, wherein the frame comprises an upper beam and a lower beam and the bridge plate includes openings for receiving ends of the upper beam and the lower beam.

15. The leaching tube assembly of claim 13, wherein the end plate includes an opening for receiving an effluent inlet pipe.

16. The leaching tube assembly according to claim 1, further comprising at least one curtain inside the spiral tube base and hung from the frame.

17. The leaching tube assembly according to claim 16, wherein the curtain comprises a polyester fabric.

18. A method of dispersing effluent from a septic tank into the surrounding soil, comprising the steps of:
    providing a tube assembly including a spiral tube base having an inside perimeter having a height, and a water permeable material wrapped around the spiral tube base;
    providing a vertical frame located within the spiral tube base having spaced-apart vertical columns that are perpendicular to a longitudinal axis of the spiral tube base, and upper and lower beams connected by the vertical columns, the upper beam located at a top of the height and the lower beam located at the bottom of the height, at least some of the columns and beams being tubular members;
    burying the tube assembly in the soil and delivering effluent into the spiral tube base;
    delivering air into the frame and delivering air out of the frame and into the spiral tube base; and
    dispersing the effluent through the spiral tube base and into the surrounding soil.

19. The method according to claim 18, comprising the further step of providing a curtain hung from the frame within the spiral tube base.

20. A leaching tube assembly for burial in the earth to disperse effluent into surrounding soil, comprising:
    a tube having a longitudinal axis, an inlet for receiving effluent, and tube openings to disperse effluent into the surrounding soil;
    a water permeable material wrapped around the tube; and
    a vertically oriented frame having spaced-apart columns that are perpendicular to the longitudinal axis, located within the tube and supporting a vertical dimension of the tube, wherein the frame includes tubular members that can contain and convey air, and the frame includes an air inlet into the tubular members and a plurality of air outlets out of the tubular members and inside the tube.

21. The leaching tube assembly of claim 20, wherein the tubular members include an upper beam and a lower beam, arranged at a top and bottom of the tube, respectively, and the plurality of spaced-apart vertical columns connect the upper beam and the lower beam, wherein the air is received into the frame and is delivered into the columns, and a lower portion of the frame has air openings to deliver air into the tube.

22. The leaching tube assembly according to claim 20, further comprising at least one curtain inside the tube and hung from the frame.

23. The leaching tube assembly according to claim 20, wherein the tube has, a sidewall having the tube openings through the sidewall and an inside perimeter of the sidewall having a height; and the vertically oriented frame having upper and lower beams at a top of the height and at a bottom of the height respectively, the columns connecting the beams.

* * * * *